(12) United States Patent
Schuppan

(10) Patent No.: US 7,397,583 B2
(45) Date of Patent: *Jul. 8, 2008

(54) METHOD AND DEVICE FOR PROOFING RASTER PRINT DATA WHILE MAINTAINING THE RASTER INFORMATION

(75) Inventor: Holger Schuppan, Bottrop (DE)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/778,630

(22) Filed: Jul. 16, 2007

(65) Prior Publication Data

US 2007/0263263 A1 Nov. 15, 2007

Related U.S. Application Data

(63) Continuation of application No. 10/149,099, filed as application No. PCT/DE01/03760 on Oct. 4, 2001, now Pat. No. 7,245,400.

(30) Foreign Application Priority Data

Oct. 6, 2000 (DE) .................. 100 49 933
Nov. 11, 2000 (DE) .................. 100 56 057

(51) Int. Cl.
*G06K 15/00* (2006.01)
*G06K 9/40* (2006.01)

(52) U.S. Cl. .................. 358/3.2; 358/1.9; 358/537; 382/260; 382/261

(58) Field of Classification Search ............ 358/1.9, 358/3.2, 537; 382/260, 298
See application file for complete search history.

(56) References Cited

U.S. PATENT DOCUMENTS

| 5,491,558 | A | | 2/1996 | Hamilton et al. |
| 5,526,140 | A | * | 6/1996 | Rozzi .................. 358/535 |
| 5,671,298 | A | | 9/1997 | Markandey et al. |
| 5,734,801 | A | | 3/1998 | Noguchi et al. |
| 5,854,883 | A | * | 12/1998 | Madeley .................. 358/1.9 |
| 5,982,381 | A | * | 11/1999 | Joshi et al. .................. 345/629 |
| 6,101,285 | A | | 8/2000 | Fan |
| 6,252,676 | B1 | | 6/2001 | Azima et al. |
| 7,245,400 | B2 | * | 7/2007 | Schuppan .................. 358/3.2 |

FOREIGN PATENT DOCUMENTS

| JP | 2000115531 | 4/2000 |
| JP | 2000224415 | 8/2000 |
| JP | 2002-533589 | 11/2006 |
| WO | WO 0074372 | 12/2000 |

* cited by examiner

*Primary Examiner*—King Poon
*Assistant Examiner*—Quang N Vo
(74) *Attorney, Agent, or Firm*—James Trosino

(57) ABSTRACT

The screened printing data are subjected to a filtering method, the raster information being maintained. Intermediate tonal values are produced by the filtering method, using the binary tonal values, the intermediate tonal values being configured in such a way that, by means of a color space transformation, transformed tonal values and/or intermediate tonal values can be formed which represent a true-to-color proof.

8 Claims, 9 Drawing Sheets

300

301

METHOD AND DEVICE FOR PROOFING RASTER PRINT DATA WHILE MAINTAINING THE RASTER INFORMATION

REFERENCE TO RELATED APPLICATIONS

This application is a continuation of U.S. patent application Ser. No. 10/149,099, filed 5 Aug. 2002, now U.S. Pat. No. 7,245,400, which is a U.S. National Stage application under 35 U.S.C. § 371 of International Patent Application Serial No. PCT/DE01/03760, filed 4 Oct. 2001, which claims priority from German Patent Application Serial No. 10049933.3, filed 6 Oct. 2000 and German Patent Application Serial No. 10056057.1, filed 11 Nov. 2000, all of which are incorporated by reference herein in their entirety.

BACKGROUND

In the course of quality assurance in the printing industry and, at the same time, under the pressure for cost reduction, it is known to simulate the printing process on a printing machine on a different appliance before the actual edition print. This other appliance is nowadays conventionally a color printer which, by suitable calibration by means of color profiles in drive software, is made capable of producing a printout which is significantly more cost-effective than would be possible with the printing machine, but at the same time has essential features of the subsequent print on the printing machine. The result of printing print data on an appliance which simulates specific characteristics of the print subsequently produced on the printing machine is referred to in the printing industry as a proof, the procedure itself is referred to as proofing.

Expressed in another way, a proof is understood to mean a test print as a replacement initial print, primarily for the simulation of four-color prints. In order to distinguish better from the result of printing on the actual printing machine, that is to say the print, the term proof will be used below for the test print, that is to say for the printing of the printing data on an appliance which simulates specific characteristics of the print subsequently produced on the printing machine.

For most methods in the printing industry, the printing data provided for the reproduction are screened before the production of the printing plate. This screening is necessary to be able to reproduce tonal value graduations in the print. The reason for this is that the ink to be printed in the printing machine itself does not have any graduations. For this reason, the amount of ink which is printed onto a specific area of the printing material is controlled via a raster.

The general operating sequence during printing will be represented below using a block diagram 500 shown in FIG. 5. Unscreened printing data 501 are projected onto screened printing data 503 by means of a raster image processor 502 (RIP). The screened printing data 503 are printed by a printing machine 504, by which means a print 505 is produced. The unit designated as a printing machine 504 may be a digital printing machine or a printing machine which is coupled to a film exposer and printing-plate copier or to a digital printing-plate exposer. For the unit, it is important only that the unit converts the screened printing data 503 into the final result, the print 505.

The methods for proofing printing data according to the prior art can be divided up into three groups:

a.) methods which operate with unscreened printing data;

b.) methods which operate with screened printing data;

c.) methods which operate with screened printing data and remove the raster from the printing data again by means of a descreening method, as it is known.

The following advantages and disadvantages result from the respective procedures, which will be explained in more detail below:

a.) Methods Which Operate with Unscreened Printing Data (cf. FIG. 6*a* and FIG. 6*b*)

In this method, as shown in the block diagram 600 in FIG. 6*a*, the unscreened printing data 501 are fed to a proofer 601 and, in a color management system, as it is known, are subjected by the latter to a color space transformation and then screened in a suitable way for the proofer 601 and output by the latter, by which means the proof 602 is produced. With the proofing method using unscreened printing data 501 it is possible with good quality to simulate the color response during screening and printing on the printing machine 504. Given appropriate calibration by means of color profiles, the results, that is to say in the proof 602, agree so precisely with the print 505 in terms of coloration that the proof 602 is referred to as true to color. This means that the proof 602 can be used for assessing the color quality of the subsequent print 505.

FIG. 6*b* shows an example 603 of a proof 602 for unscreened printing data 501, according to this example 603 a 50 percent tonal value before screening. The drawback with this procedure is, in particular, that the printing data likewise have to be screened in order to be output on the proofer 601. However, this screening on the proofer 601 does not correspond to the screening on the printing machine 504 and, at best, may be similar to the latter. This means that a proof 602 created with the aid of the unscreened printing data 501 is not able to provide the user with any information about the quality of his screening. Faults which arise during the screening cannot be detected with such a proof 602. Possible faults are, for example, undesired patterns in the individual colors or a Moiré, as it is known, when the colors are overprinted.

b.) Methods Which Operate with Screened Printing Data (cf. FIG. 7*a* and FIG. 7*b*)

In a proofing method which uses screened printing data 503, the unscreened printing data 501 are projected onto screened printing data 503 by means of the raster image processor 502 (RIP). The screened printing data 503 are fed to a proofer 701 and output by the latter, by which means the proof 702 is produced. According to this procedure, separate screening in the proofer 701 is not necessary (see block diagram 700). One advantage of this procedure is to be seen in particular in the fact that the screening, as will subsequently also be visible on the print 505, is shown to the user on the proof 702. However, one disadvantage of this procedure is to be seen in the fact that it is not possible to achieve a true-to-color-proof 702.

The reason for this is, in particular, that during the screening operation, all the tonal values (luminance values and/or chrominance values) are reduced to only two tonal values, namely a first tonal value with "0" percent application of color and a second tonal value with "100" percent application of color. Intermediate steps no longer exist (cf. FIG. 7*b*, in which a 50 percent tonal value 703 is shown after screening). During a color space transformation to be carried out, only these two color values would be transformed. As a result, however, no matching to the color response of the proofer can be achieved any more, since intermediate tones would necessarily also be required for this purpose.

c.) Methods Which Operate with Screened Printing Data and Remove the Screen from the Printing Data Again by Means of Descreening Methods, As They Are Known
(cf. Block Diagram 800 in FIG. 8)

In such a method, the screened printing data 503 are subjected to descreening 801, and the unscreened printing data 802 thus formed are fed to a proofer 803 and output by the latter, by which means the proof 804 is produced. Expressed in another way, the raster information is calculated from the image again (the screened printing data 503), in order to recover the original, unscreened information (unscreened printing data 501, 802). Using the unscreened printing data 802, the procedure is then that described under point a). The procedure according to point c) therefore has the same advantages and disadvantages as the procedure according to point a). Such a method is generally used when there is no possibility of tapping off the unscreened printing data 501 in an existing operating sequence, but the main focus is the color fidelity.

SUMMARY

The invention is based on the problem of specifying a method and an apparatus for proofing screened printing data while maintaining the raster information, with which the color fidelity of the proof, as compared with the print to be produced, is improved with respect to the known method.

The problem is solved by the method and the apparatus for proofing screened printing data while maintaining the raster information having the features according to the independent patent claims.

In a method for proofing screened printing data while maintaining the raster information, which has binary tonal values, the screened printing data are subjected to a filtering method, the raster information being maintained. By means of the filter method, intermediate tonal values are produced by using the binary tonal values. The binary tonal values are to be understood, for example, as tonal values which have "0" percent application of color (first binary tonal value) or "100" percent application of color (second binary tonal value). By contrast, intermediate tonal values are tonal values with an application of color between "0" and "100" percent. The intermediate tonal values are configured in such a way that, by means of a color space transformation, transformed tonal values and/or intermediate tonal values can be formed, which represent a true-to-color print. An apparatus for proofing screened printing data while maintaining the raster information, which has binary tonal values, has a processor which is set up in such a way that the method steps described above can be carried out.

The invention now makes it possible to create true-to-color proofs from digital printing data which are already in the screened form suitable for the subsequent printing on a printing machine. This provides the user with the possibility of assessing both the subsequent coloration of the print and the raster information before starting the printing machine. Clearly, according to the invention screened printing data are used, but these are changed in such a way that, firstly, intermediate tones (intermediate tonal values) are again produced, in order to be able to carry out a high-quality color space transformation, but secondly the raster information is maintained. Therefore, the disadvantages of the methods according to a), b) and c) are avoided, while substantially all the advantages of the methods according to a), b) and c) are combined in one method.

Clearly, the invention can be seen in the fact that the raster information is not calculated out by means of a descreening method, but that, for example, a softening method, as it is known, or scaling method is applied to the raster points contained in the printing data. Expressed in another way, this means that a method for the true-to-color proofing of screened printing data while maintaining the raster information is specified, in which the screened printing data are subjected to a softening algorithm which maintains the characteristic raster information comprising screen width, screen angle and dot shape of the screen but at the same time, in addition to the 0-percent and 100-percent tonal values contained in the raster data, produces intermediate tonal values which, via a color management system, as it is known, contained in the proofer, permit a color space transformation to be carried out, whose result is a true-to-color proof.

Preferred developments of the invention emerge from the dependent claims. According to one development of the invention, the filtering method used is a softening method. A softening method is understood to mean a filtering method in image processing with which the image is depicted unsharply. In the softening method, high-contrast edges are smoothed by the pixels located at the edge of the dark areas being lightened and the pixels located at the edge of the light areas being darkened.

A softening radius used in the softening method is preferably chosen such that the softening method meets the following requirements:
maintenance of the raster information; and
production of intermediate tonal values in such a way that color management can be carried out using the intermediate tonal values to produce a true-to-color proof.

The step of choosing the softening radius can comprise the following steps:
a) calculation of the frequency distribution P(f) of the percentage area coverage $f (0 \leq P \leq 1, 0 \leq f \leq 100\%)$ for a predefined softening radius $R=R_0$;
b) determination of the maximum $P_{max}(f_0)$;
c) determination of the maximum value $f_1$ and of a minimum value $f_2$ with $f_1 < f_0 < f_2$, for which $P(f_1) < P'$ and $P(f_2) < P'$ $(0 < P' < 1)$;
d) if $f_2 - f_1 \geq \Delta f'$ $(0 < \Delta f' < 100\%)$: calculation of the frequency distribution P(f) for a softening radius increased by a predefined value $\Delta R$;
e) repetition of the steps b)-d) up to a softening radius R at which $f_2 - f_1 < \Delta f'$;
f) output of the softening radius R.

The value $\Delta f'$ can lie, for example, in the range from 20%-30%, preferably at 25%. The value P' can, for example, lie in the range between 0.15 and 0.25, preferably at 0.2.

Alternatively, according to a further refinement of the invention, the filtering method used is a scaling method, for example a bicubic scaling method or a bilinear scaling method. The binary tonal value and/or the intermediate tonal value used can be a luminance value and/or a chrominance value, which is/are assigned to a pixel. Furthermore, the raster information used can be the screen resolution, and/or the screen angle, and/or the dot shape of the screen.

BRIEF DESCRIPTION OF THE DRAWINGS

Features of the present invention can be more clearly understood from the following detailed description considered in conjunction with the following drawings, in which the same reference numerals denote the same elements throughout, and in which:

FIGS. 2a and 2b are block diagrams in which an image detail, which represents scanned data (FIG. 2a) and an associated histogram (FIG. 2b) for representing the percentage distribution of the color tonal values in the image detail from FIG. 2a;

FIGS. 3a and 3b are block diagrams of an image detail which has been obtained by applying a Gaussian softening method with non-optimized parameters to the image detail according to FIG. 2a, and an associated histogram (FIG. 3b) for representing the percentage distribution of the color tonal values in the image detail from FIG. 3a;

FIG. 4b is an algorithm for calculating the softening radius used in the softening method according to FIG. 4a;

DETAILED DESCRIPTION

Figure 1A:
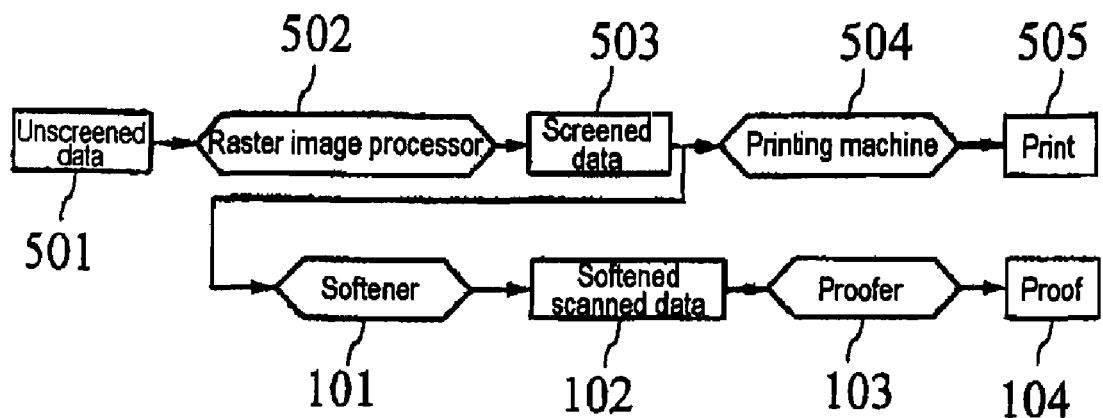
FIGS. 1a and 1b are block diagram in which the individual method steps of an exemplary embodiment of the invention (FIG. 1a) and an example of a proof obtained by means of the method according to the exemplary embodiment (FIG. 1b) are shown.
Figure 1B:
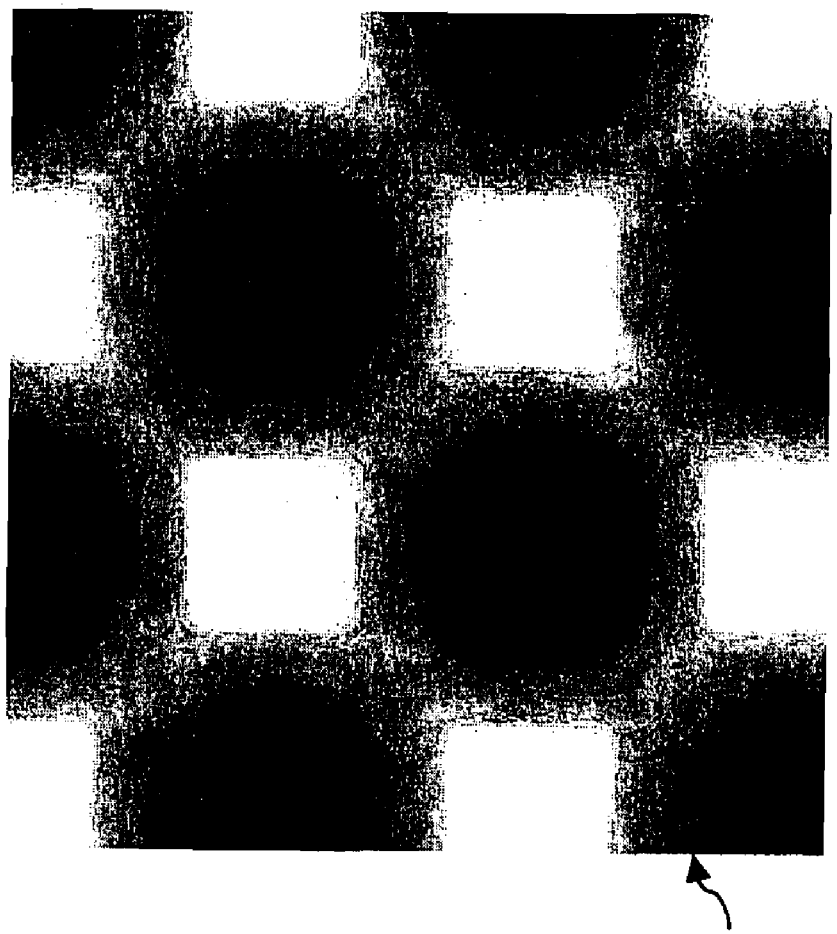

Unscreened printing data 501 are projected onto screened printing data 503 by means of a raster image processor 502 (RIP) (cf. FIG. 1b). The screened printing data 503 are printed by means of a printing machine 504, by which means a print 505 is produced. The screened printing data 503 have raster information, a screen being characterized by the spacing of centers of the screen dots (screen resolution), by the angle with respect to the horizontal assumed by a line drawn through these centers (screen angle), and by the shape of the screen dots (for example, round dots, ellipses, lines, squares, crosses are usual).

In order to create a proof, the screened data 503 according to this exemplary embodiment are subjected to a softening method 101, by which means intermediate tones (intermediate tonal values) with an application of color with percentages between 0 and 100 percent application of ink are produced. By means of a suitably chosen softening method 101 with the suitably chosen parameters, it is possible in turn to produce so many tonal value steps that the color fidelity can also be ensured. The requirements on a suitable softening method will be explained in more detail with reference to FIG. 2-FIG. 4.

The data 102 formed by means of the softening method 101 are fed to a proofer 103 and output by the latter, by which means a proof 104 is formed. An example of such a result of the softening 101 for a 50 percent tonal value after screening and subsequent softening 101 has been carried out is shown in FIG. 1b. It can be seen from FIG. 1b that the raster information has intrinsically been maintained. All the above-described elements of the raster information can still be seen in FIG. 1b.

However, when choosing a suitable softening method, care must be taken that the degree of softening is chosen to be neither too high nor too low, as will be explained in more detail below. In particular, the softening method applied should meet the following characteristics:

(i) Maintenance of the raster information
(ii) Production of intermediate tonal values in such a way that effective color management is subsequently possible with these intermediate tonal values.

In Relation to Requirement (i):

The maintenance of the raster information is no longer ensured if the softening filters the raster information out of the image, that is to say if too severe a softening operation is carried out. This means that the softening radius must not be chosen to be too high.

In Relation to Requirement (ii)

In the event of excessively weak softening, the intermediate tonal values produced are not sufficient for specific color management to be carried out. As a result, no adequate matching to the color response of the proofer can be carried out, so that no color fidelity of the proof is achieved. An algorithm for calculating suitable softening parameters will be described in more detail in conjunction with FIG. 4b.

Figure 2A:
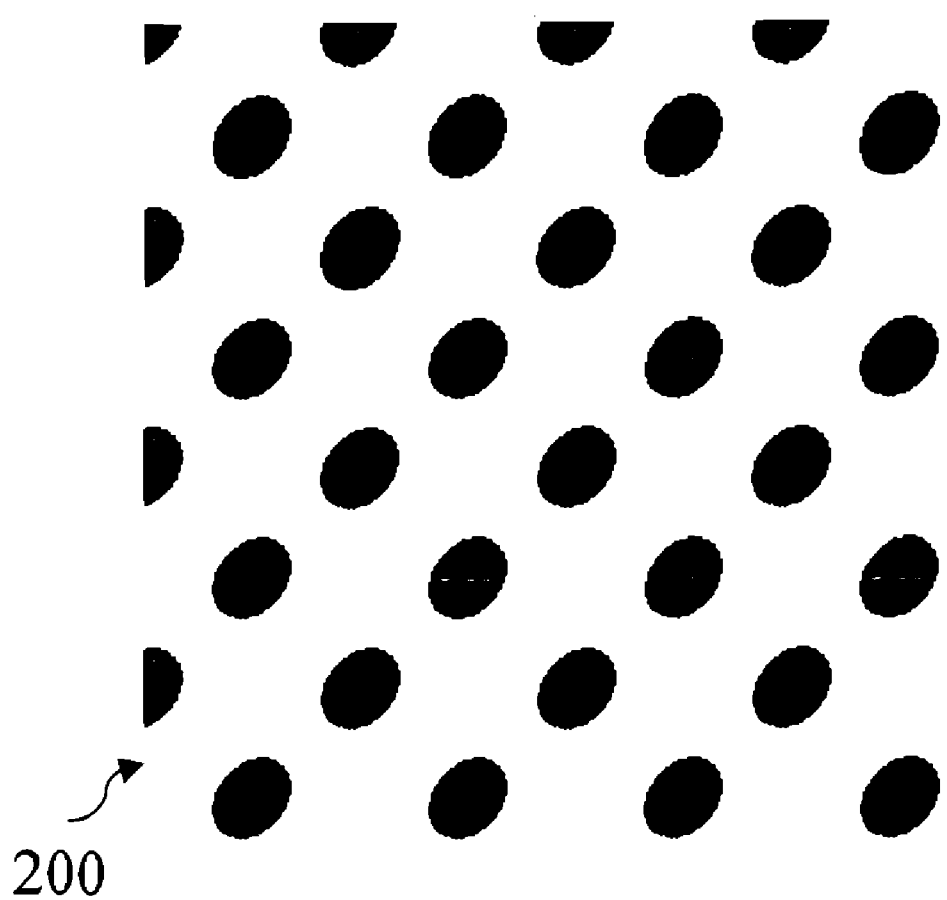
Figure 2A:
Figure 2B:

FIG. 2a firstly shows an initial image 200 or the detail from an initial image without softening, that is to say a pure raster image with a 20-percent area coverage. FIG. 2b shows an associated histogram 201. The histogram indicates on the abscissa (x-axis) the area coverage values f, that is to say the percentage of the area coverage in the respective image detail, f in the range (0% ≦ f ≦ 100%). In addition, the area coverage f is shown schematically at the lower edge of the histogram. The values P on the ordinate (y-axis) indicate the percentage frequency of the area coverage values shown on the abscissa in the respective image detail, P lying in the range (0 ≦ P ≦ 1).

As FIG. 2b reveals, the 20-percent area coverage in the image detail 200 is brought about by the fact that 20% of the total area has a 100-percent area coverage and 80% of the total area remains white, that is to say has a 0-percent area coverage. Effective color management, in which for example the areas around a 20-percent area coverage are to be specifically changed, cannot be carried out on the image detail 200, since in the image detail 200 there are no areas with f=20% but only areas with f=0% or with f=100%. However, these may not be changed, since they correspond to the paper background and to the area with full area coverage. Given the lack of existence of intermediate tonal values f with 0<f<100%, color management and therefore the creation of a true-to-color proof cannot be carried out, so that the above requirement (ii) is not met.

Figure 3A:
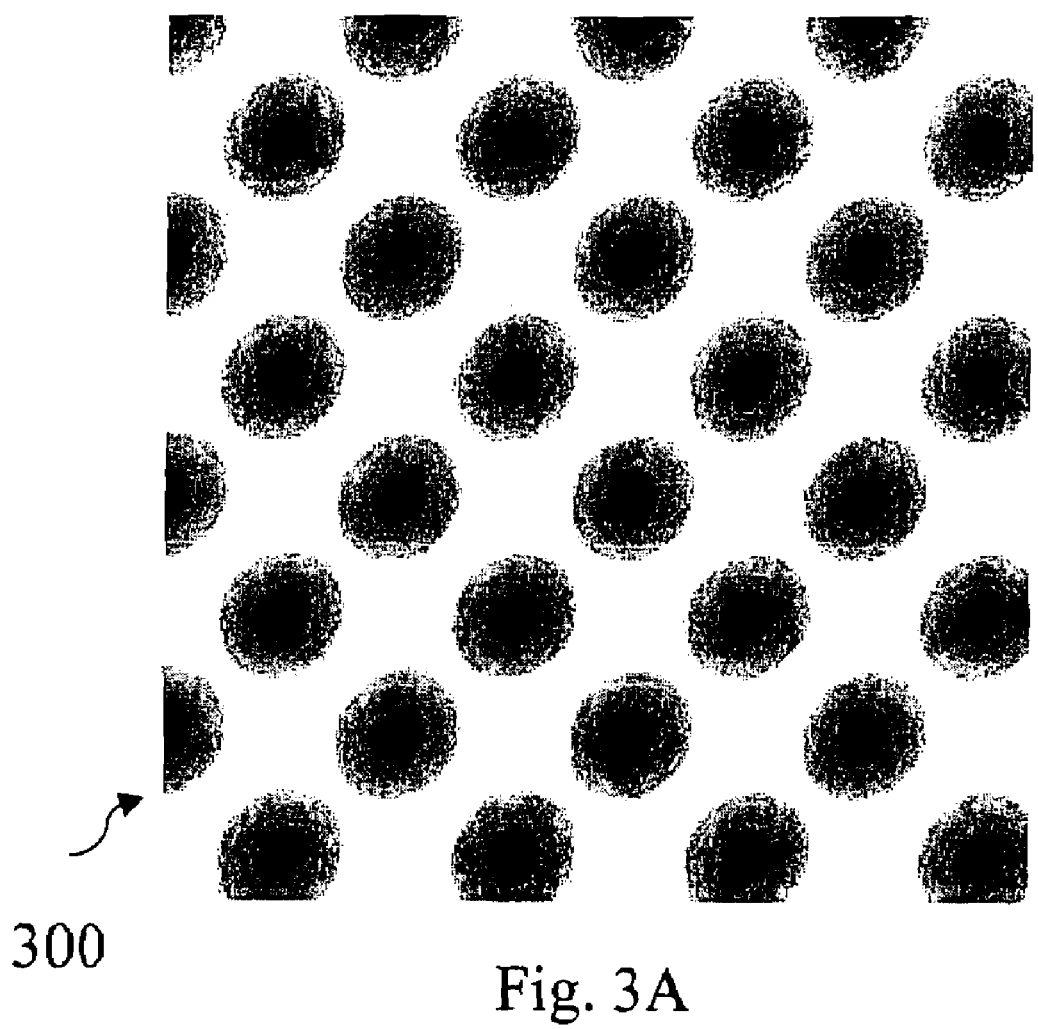
Figure 3B:
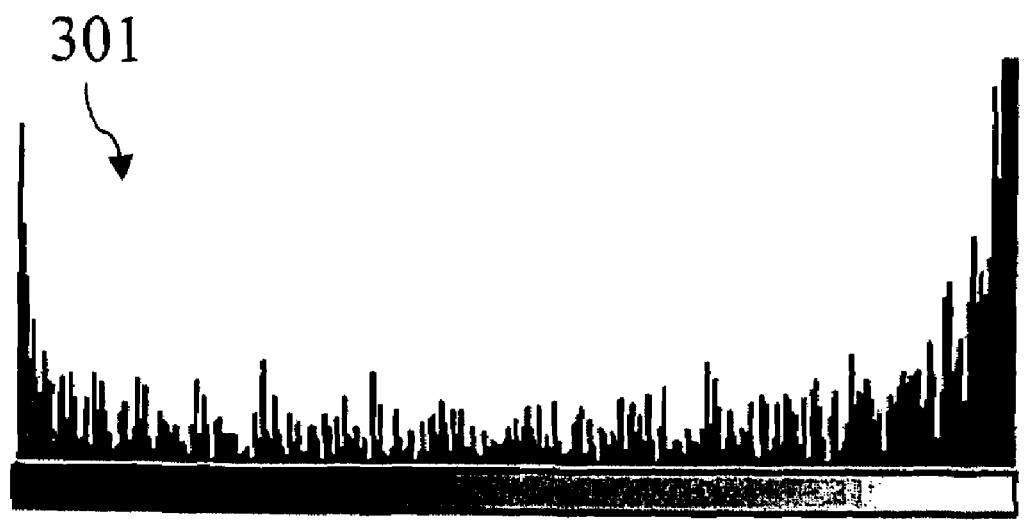

FIG. 3a illustrates an image detail 300 which has been obtained by applying a Gaussian softening method to the image detail 200 according to FIG. 2a. As can be seen from the associated histogram 301 in FIG. 3b, here there are numerous intermediate tonal values, but these have a very broad distribution without pronounced maxima or minima. Consequently, for example, the application of color management for specifically influencing the area with 20-percent area coverage in the image detail 300 would lead for example to the area with 80-percent coverage also being influenced in approximately the same way. Here, too, specific color management and therefore the production of a true-to-color proof is therefore not possible either, so that here likewise the above requirement (ii) is not met.

A softening algorithm which is suitable for both the aforementioned requirements (i) and (ii) will preferably have its parameters set on the basis of the resolution of the original image, of the screen resolution and of the resolution of the target image. By means of a softening algorithm whose parameters are set suitably in such a way, starting from the image detail 200 illustrated in FIG. 2a, for example the histogram 400 shown in FIG. 4a of the percentage distribution of the tonal values may be obtained, as will be explained in more detail below.

Figure 4A:
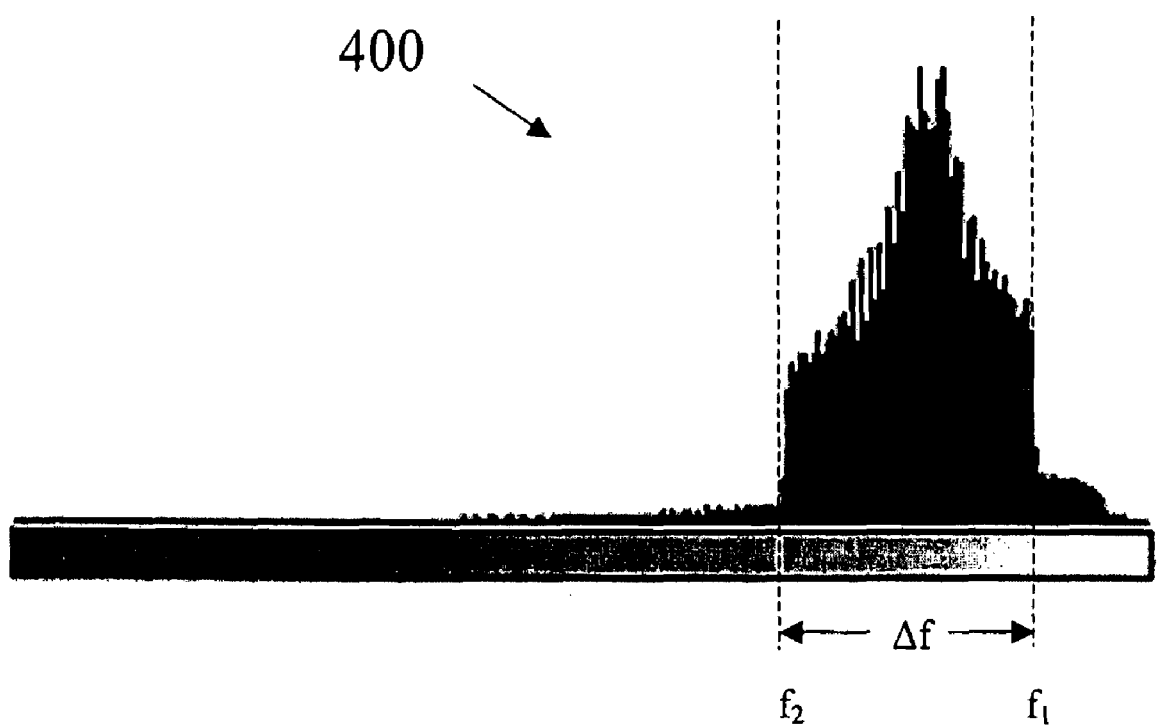
FIG. 4a is a histogram for representing the percentage distribution of the color tonal values in an image detail which has been obtained by applying a softening method according to the invention with optimized parameters to the image detail according to FIG. 2a (FIG. 4a)

If, in the histogram shown in FIG. 4a, the frequency values lying above a specific limit P' and the area of the abscissa (x-axis) over which these frequency values P>P' extend are considered, then it transpires that the percentage frequency distribution of the area coverage values are substantially concentrated on a closely delimited area $\Delta f$ of the abscissa, in which the frequency values P form a pronounced maximum.

In quantitative terms, this means that, for example, starting from the maximum $P_{max}$ of the frequency distribution achieved in FIG. 4a, the color coverage values to which a frequency still lying above P=0.2 is to be assigned lie in a relatively closely limited area of the abscissa. In the case of the exemplary embodiment shown in FIG. 4a, this means that these color coverage values are concentrated in an area of only $\Delta f$=25% of the entire abscissa, that is to say approximately in the interval of the abscissa between $f_1$=10% and $f_2$=35% area coverage.

Because of the distribution of the intermediate tonal values shown in FIG. 4a, specific lightness ranges or area coverage values of the respective image detail, namely for example the area coverage within or outside the aforementioned range between 10-percent and 35-percent area coverage may be influenced specifically, without in the process also simultaneously changing all or a large number of other lightness ranges. This makes it possible to carry out effective color management in order to match the color response of the proofer, so that the color fidelity can be ensured and the above requirement (ii) is met.

When the Gaussian softener is used, the single variable parameter is the radius of the softening window, in other comparable algorithms it is the window size of the filter. To achieve an optimum result, this radius or this window size can be varied by means of a computer program over a previously defined test section of the image until the result is a histogram as was described using FIG. 4a. The value found in this way is then used to soften the entire image.

An algorithm for determining the suitable radius of the softener will be explained in more detail in the following text with reference to FIG. 4b. In a first step $S_1$, a starting value R=$R_o$ is set as the radius of the softener. In the next step $S_2$, the above-described histogram is determined for this radius R by using an arbitrarily selected image detail, that is to say for each value of the percentage area coverage f (between 0 and 100%), the respective frequency P (between 0 and 1) is calculated. In a next step $S_3$, the maximum $P_{max}$(f) is determined in the histogram determined in step $S_2$. In the following text, it will be assumed that this occurs at an area coverage value f=$f_0$.

In a next step $S_4$, a search is made in the histogram, beginning from the maximum $P_{max}(f_0)$, to both sides in each case up to an area coverage value at which the frequency value P has fallen to P<0.2. In other words, the largest value f, below $f_0$ and the smallest value $f_2$ above $f_0$ are determined at which the associated frequency values in the histogram are less than 0.2. In the step $S_5$, the difference $\Delta f$ between the values $f_1$ and $f_2$ determined in this way is calculated. In step $S_6$, a check is made to see whether this difference $\Delta f$ is less than $\Delta f'$=25%.

If this is the case, the current radius value $R_0$ is output and this radius is used for softening the entire image. However, if this is not the case, the radius is increased by an increment $\Delta R$ to R=$R_0$+$\Delta R$ and the algorithm is carried out for this value R. This is repeated until the abovementioned interval $\Delta f$ between $f_1$ and $f_2$ is restricted sufficiently, that is to say the condition checked in step $S_6$ is satisfied. As soon as this is satisfied, the algorithm is terminated and the radius R determined is used for softening the entire image.

Figure 4B:
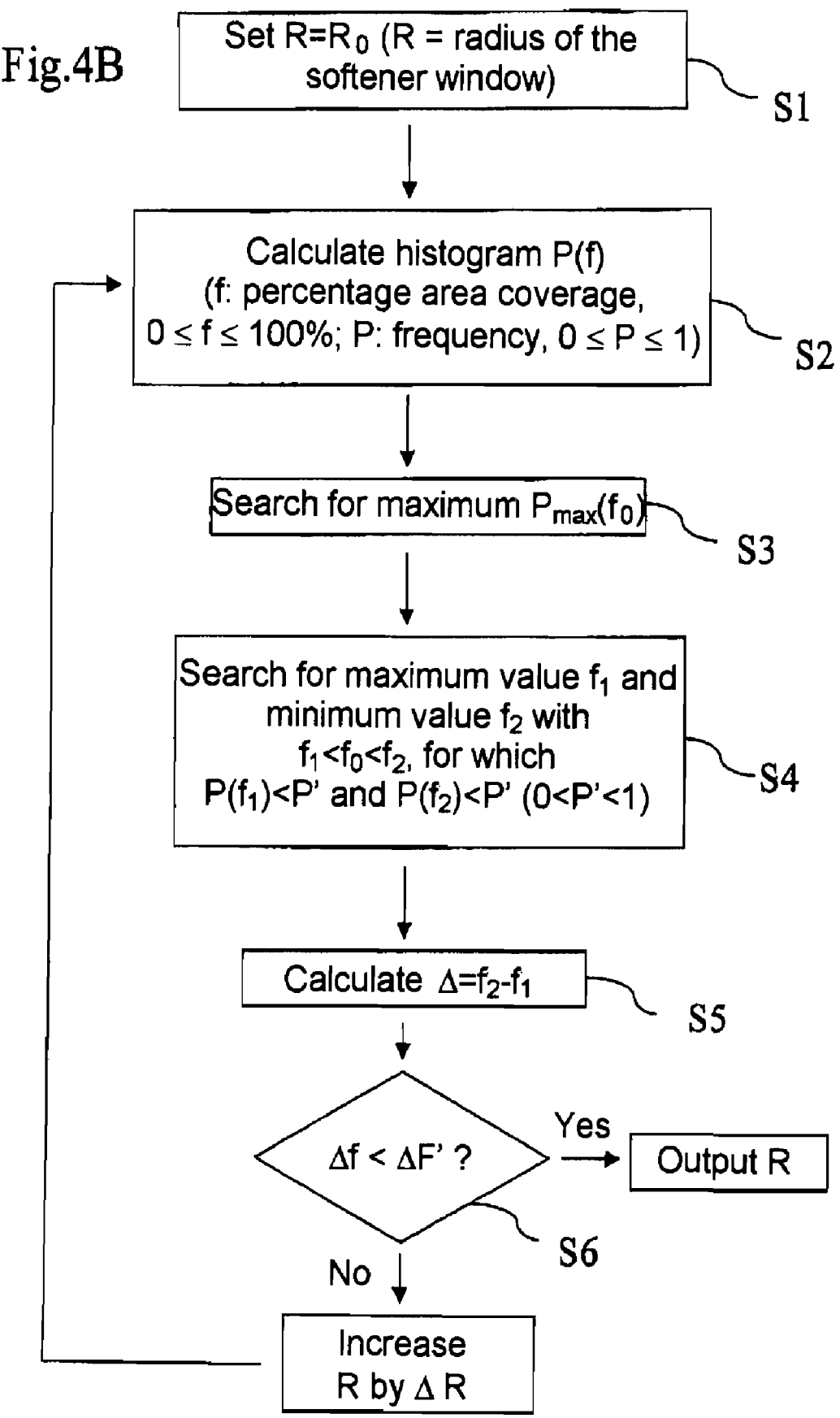
Figure 5:
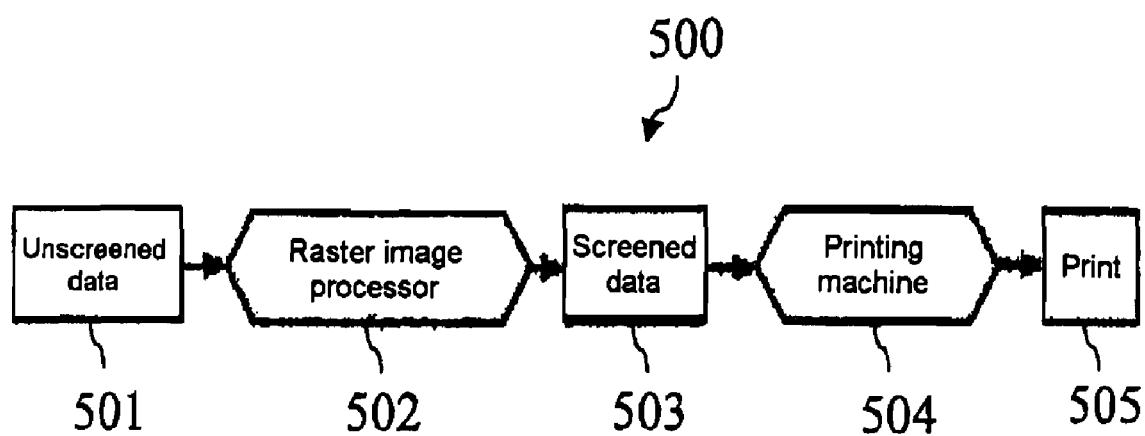
FIG. 5 is a block diagram in which a generally conventional operating sequence for creating a print is represented.
Figure 6A:
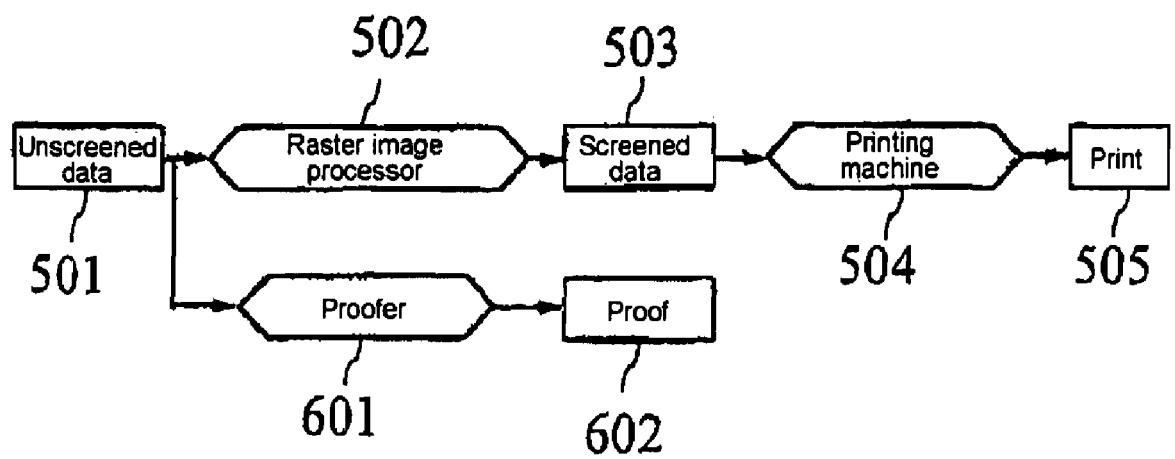
FIGS. 6a and 6b is a block diagram in which the individual method steps of a method which operates with unscreened printing data (FIG. 6a) and an example of a proof obtained by means of the method from FIG. 6a (FIG. 6b) are shown.
Figure 6B:
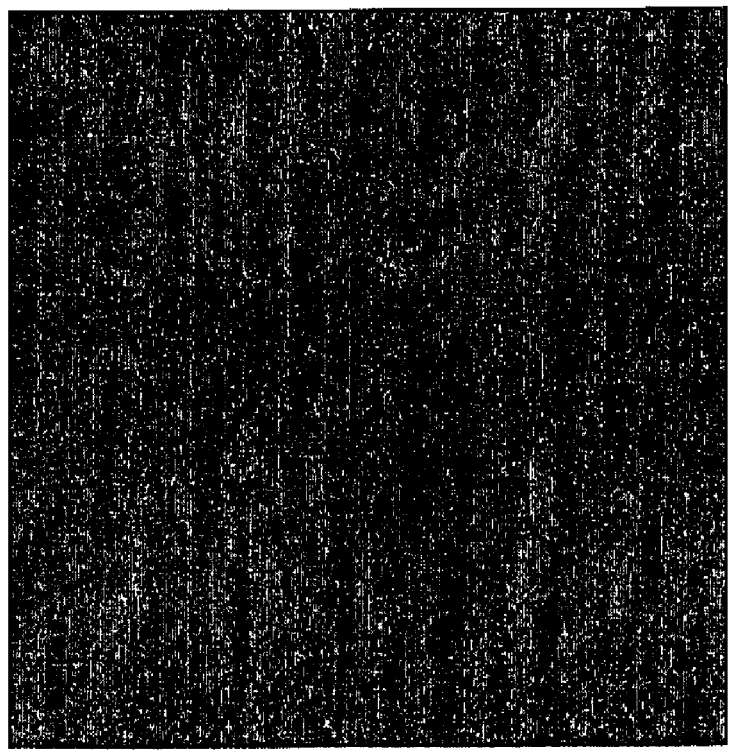
Figure 7A:
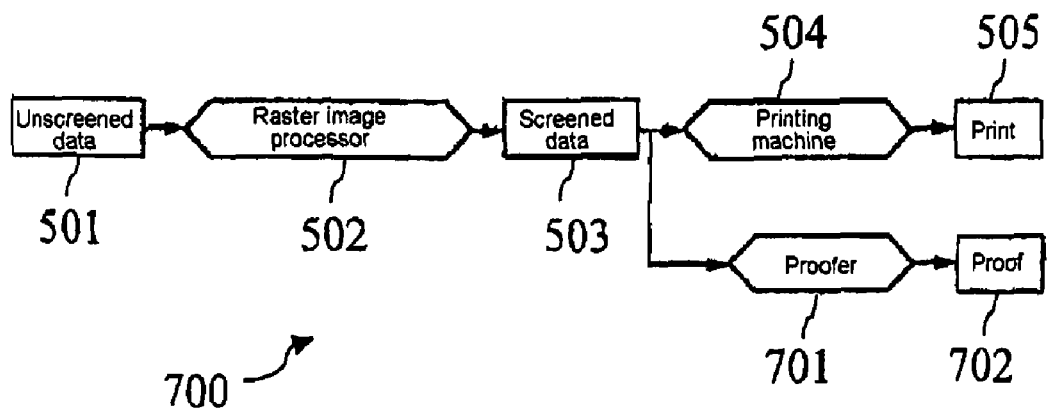
FIGS. 7a and 7b are block diagrams in which the individual method steps of a method which operates with screened printing data (FIG. 7a) and an example of a proof obtained by means of the method from FIG. 7a (FIG. 7b) are shown.
Figure 7B:
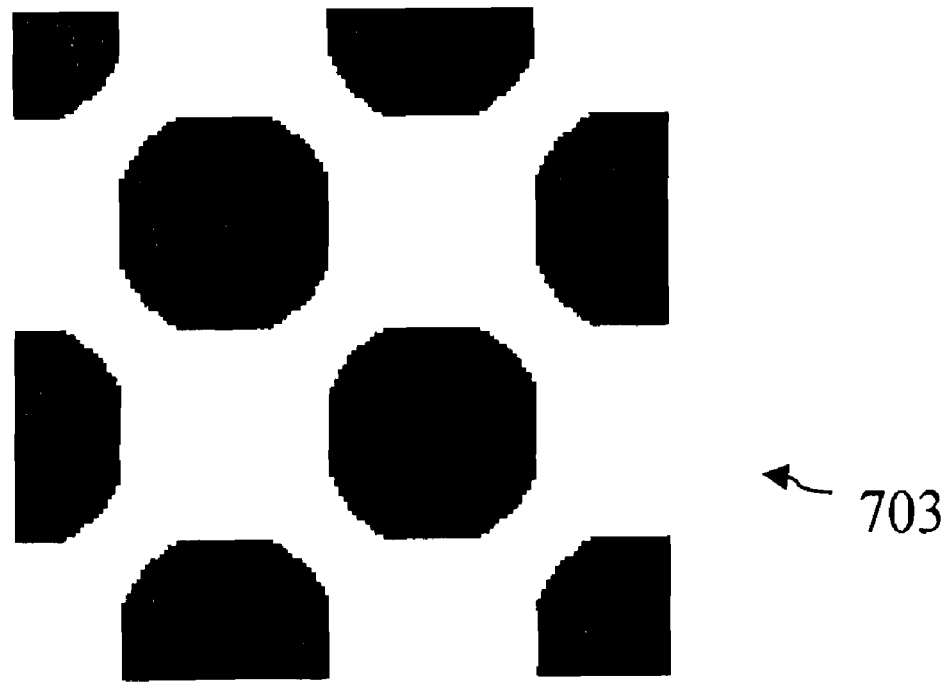
Figure 8:
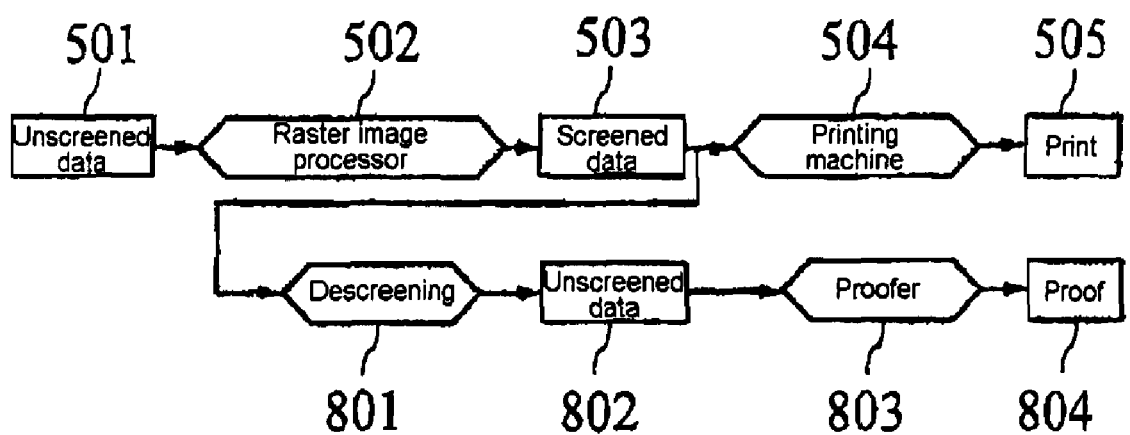
FIG. 8 is a block diagram in which the individual method steps of a method which operates with descreened printing data are shown.

Of course, depending on the specific conditions or requirements, other values for $\Delta f'$ and P' are used in the algorithm of FIG. 4b instead of the abscissa range of $\Delta f'$=25% or instead of the frequency limiting value of P'=0.2. One further softening possibility consists in using a scaling algorithm which has a softening effect during any possibly necessary scaling of the scanned printing data 503 from the resolution of the printing machine 504 to the resolution of the proofer 103. Examples of this are known as bicubic or bilinear scaling. These scaling methods interpolate the values to be scaled in a manner such that the result is the same as the effect of softening. The scaling method should carry out the matching of the resolution in such a way that no disruptive structures or artifacts are produced. Since, in very rare cases, the resolution of the scanned printing data is the same as the resolution of the proofer, the printing data normally have to be scaled in any case. Therefore, the obvious course here is to use such an algorithm straight away.

The foregoing merely illustrates the principles of this invention, and various modifications can be made by persons of ordinary skill in the art without departing from the scope and spirit of this invention.

The invention claimed is:

1. Apparatus for proofing screened printing data while maintaining raster information having binary tonal values, the apparatus comprising:
   means for providing screened printing data; and
   means for filtering the screened printing data, wherein filtering comprises softening using a softening radius R that maintains the raster information and produces intermediate tonal values, wherein the softening radius R is determined by:
   a) calculating of a frequency distribution P(f) of a percentage area coverage f ($0 \leq P \leq 1$, $0 \leq f \leq 100\%$) for a predefined softening radius R=$R_o$;
   b) determining a percentage area coverage $f_0$ at which P(f) is maximum;
   c) determining of a maximum value $f_1$ and of a minimum value $f_2$ with $f_1 < f_0 < f_2$, for which $P(f_1)$<P' and $P(f_2)$<P' (0<P'<1);
   d) if $f_2 - f_1 \geq \Delta f'$ (0<$\Delta f'$<100%), then calculating of the frequency distribution P(f) for a softening radius increased by a predefined value $\Delta R$;
   e) repeating of the steps b)-d) to determine the softening radius R at which $f_2 - f_1 < \Delta f'$, wherein the intermediate tonal values are configured such that, by means of a color space transformation, at least one of transformed tonal values and intermediate tonal values are formed which represent a true-to-color proof.

2. The apparatus of claim 1 wherein $\Delta f'$ lies in a range from 20%-30%.

3. The apparatus of claim 1 wherein P' lies in a range between 0.15 and 0.25.

4. The apparatus of claim 1 wherein the filtering comprises scaling.

5. The apparatus of claim 4 wherein the scaling comprises bicubic scaling or bilinear scaling.

6. The apparatus of claim 1 wherein at least one of the transformed tonal value and the intermediate tonal value is a luminance value and a chrominance value, respectively.

7. The apparatus of claim 1 wherein the raster information is at least one of a screen resolution, a screen angle and a dot shape of the screen.

8. Apparatus for proofing screened printing data while maintaining the raster information having binary tonal values, the apparatus comprising:

a means for filtering screened printing data while maintaining raster information, wherein an intermediate tonal value is produced by the filtering using a binary tonal value, and wherein the intermediate tonal value is such that, by means of a color space transformation, at least one of a transformed tonal value and an intermediate tonal value is formed which represent a true-to-color proof, and wherein the processor filters the screened printing data by softening the screened data using a softening radius R, which is determined by:

a) calculating of a frequency distribution $P(f)$ of a percentage area coverage $f$ $(0 \leq P \leq 1, 0 \leq f \leq 100\%)$ for a predefined softening radius $R=R_0$;

b) determining a percentage area coverage $f_0$ at which $P(f)$ is maximum;

c) determining of a maximum value $f_1$ and of a minimum value $f_2$ with $f_1 < f_0 < f_2$, for which $P(f_1) < P'$ and $P(f_2) < P'$ $(0 < P' < 1)$;

d) if $f_2 - f_1 \geq \Delta f'$ $(0 < \Delta f' < 100\%)$, then calculating of the frequency distribution $P(f)$ for a softening radius increased by a predefined value $\Delta R$;

e) repeating of the steps b)-d) to determine the softening radius R at which $f_2 - f_1 < \Delta f'$.

* * * * *